United States Patent
Ramamurthi et al.

(10) Patent No.: US 10,635,964 B2
(45) Date of Patent: Apr. 28, 2020

(54) SELECTING OPTIMAL VARIABLES USING MODIFIED TEACHING LEARNING BASED SEARCH OPTIMIZATION TECHNIQUE

(71) Applicant: TATA CONSULTANCY SERVICES LIMITED, Mumbai (IN)

(72) Inventors: Narayanan Ramamurthi, Hyderabad (IN); Geervani Koneti, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 577 days.

(21) Appl. No.: 15/474,389

(22) Filed: Mar. 30, 2017

(65) Prior Publication Data
US 2018/0108263 A1    Apr. 19, 2018

(30) Foreign Application Priority Data
Oct. 17, 2016 (IN) .............................. 201621035471

(51) Int. Cl.
| | | |
|---|---|---|
| *G06F 17/18* | (2006.01) | |
| *G06N 3/00* | (2006.01) | |
| *G06N 5/00* | (2006.01) | |
| *G06N 5/04* | (2006.01) | |
| *G09B 5/00* | (2006.01) | |

(52) U.S. Cl.
CPC ............. *G06N 3/006* (2013.01); *G06F 17/18* (2013.01); *G06N 5/003* (2013.01); *G06N 5/04* (2013.01); *G09B 5/00* (2013.01)

(58) Field of Classification Search
CPC ......... G06N 3/006; G06N 5/003; G06F 17/18
See application file for complete search history.

(56) References Cited

U.S. PATENT DOCUMENTS

| | | | | |
|---|---|---|---|---|
| 2005/0228511 A1* | 10/2005 | Das | ................... | G05B 13/0265 700/28 |
| 2016/0225278 A1* | 8/2016 | Leddy | ................... | G06Q 20/10 |
| 2018/0164253 A1* | 6/2018 | Huang | ............... | G01N 29/2412 |

OTHER PUBLICATIONS

Rao, R. Venkata, "Review of applications of TLBO algorithm and a tutorial for beginners to solve the unconstrained and constrained optimization problems", available online Sep. 25, 2015, published in Decision Science Letters 5 (2016), pp. 1-30. (Year: 2015).*

(Continued)

*Primary Examiner* — Scott A. Waldron
(74) *Attorney, Agent, or Firm* — Finnegan, Henderson, Farabow, Garrett & Dunner LLP (57) ABSTRACT

Systems and methods include initializing a trainees population (TP), calculating an objective function (OF) of the TP to identify a trainer. A teaching pool is created using variables of each trainee and the identified trainer, and unique variables are added to obtain an updated teaching pool (UTP). Search is performed on the UTP to obtain 'm' subset of variables and OFs. The OFs of 'm' subset are compared with OFs of the trainer's and each trainee's variable and one of the trainer or each trainee are updated accordingly. An updated learning pool (ULP) is created for selected trainee and the trainees, by adding unique variables to obtain 'n' subset. The OF of 'n' subset are compared with objective functions of selected trainee and the trainees and variables are updated accordingly. These steps are iteratively performed to obtain an optimal subset of variables that is selected for teaching and learning phase.

16 Claims, 4 Drawing Sheets

(56) References Cited

OTHER PUBLICATIONS

Satapathy et al.; "A Modified Teaching-Learning-Based Optimization (mTLBO) for Global Search", Recent Patents on Computer Science, vol. 6, No. 1, pp. 60-72, (2013).
Rao et al.; "An Improved Teaching-Learning-Based Optimization Algorithm for Solving Unconstrained Optimization Problems", Scientia Iranica, vol. 20, Issue 3, pp. 710-720, (2013).
Tuo; "Modified Teaching-Learning-Based Optimization Algorithm", Control Conference (CCC), 2013 $32^{nd}$ Chinese, pp. 7976-7981, (2013).

* cited by examiner

SELECTING OPTIMAL VARIABLES USING MODIFIED TEACHING LEARNING BASED SEARCH OPTIMIZATION TECHNIQUE

PRIORITY CLAIM

This U.S. patent application claims priority under 35 U.S.C. § 119 to: India Application No. 201621035471, filed on Oct. 17, 2016. The entire contents of the aforementioned application are incorporated herein by reference.

TECHNICAL FIELD

The disclosure herein generally relates to teaching learning based search optimization techniques, and, more particularly, to systems and methods for selecting optimal variables using modified teaching learning based search optimization technique and generation of predictive models based on the selected variables.

BACKGROUND

Advancements in various sciences such as physical, life, social sciences etc., have generated large amounts of data and there is great interest make use of these data for the creation of new knowledge, as it is expected to improve the quality of human life. The quest for the new knowledge and its associated positive impact on humanity, have created an urgent need for the development efficient data analytics techniques and technologies such as high performance computing, cloud computing etc., which can handle large amounts of data. Variable selection methods are one such data analytics approach that is applied to the selection of a sub set of variables(X) from a large pool of variables based on various statistics measures. The selected variables can be used for the development of prediction models for a dependent variable(Y), when used with modelling techniques such as multiple linear regression, nonlinear regression etc. or for the generation new rules/alerts. The variables selection can be accomplished using a random or exhaustive search technique. The exhaustive search approach, which evaluates each possible combination, is a computationally hard problem and hence, can be used only for smaller subsets. In such scenarios the most alternate approach is the use of heuristic methods such as ant colony, particle swarm optimization, genetic algorithm, and the like. However, these methods cannot guarantee an optimal solution as they fail to explore the complete problem (variable) space.

Figure 1:
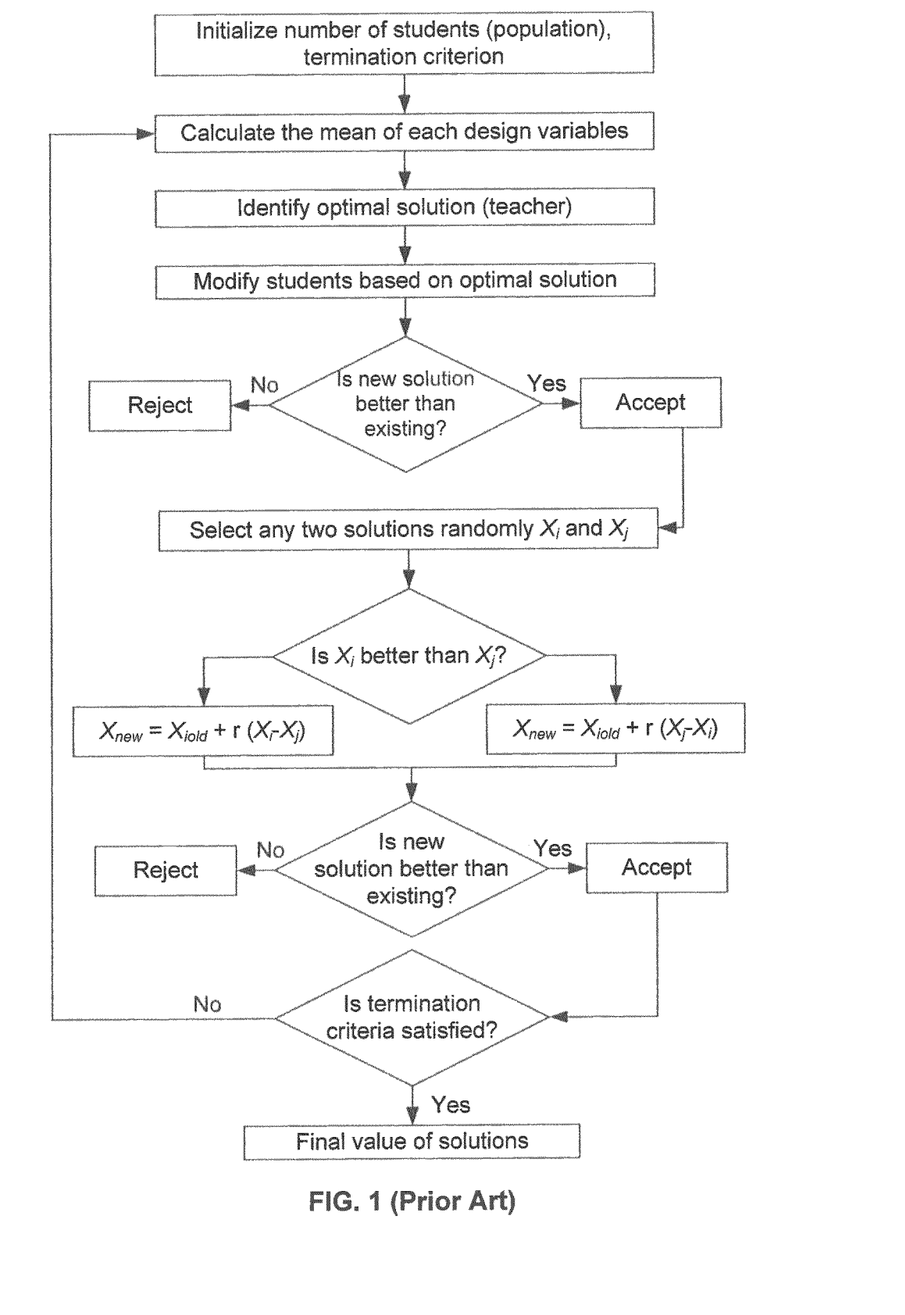
FIG. 1 illustrates the basic Teaching Learning Based Optimization (TLBO) technique.

One such heuristic method is the nature inspired optimization technique known as Teaching Learning Based Optimization (TLBO) proposed by Rao et al. The fundamentals of TLBO are based on the knowledge acquisition pattern of a classroom that can be broadly divided in to two phases: teaching and learning. In teaching phase, the students/trainees enhance their knowledge from the teacher/trainer. And, in learning phase, the students interact among themselves to further augment their knowledge acquired from the teacher. The teacher and students are evaluated or represented with the marks they obtain in individual subject, in which the subjects may be the parameters of an optimization problem or variables of a feature selection problem. After each session, a teaching and a learning phase together, the teacher is updated with the best knowledge available in the classroom and the next session is executed. Consequently, the knowledge of the teacher and the students gets maximized through a number of sessions to obtain an optimal solution. FIG. 1 illustrates the workflow of the above technique for an optimization problem. Firstly, the population, students, of the classroom is initialized and a stopping criterion and objective function to maximize or minimize is defined. Then, the objective function of the population is calculated to determine the best student, who will act as the teacher for the following session. Following which, each student $X_i$, in the teaching phase, improvises his or her solution based on the following expression:

$$X_{new} = X_{iold} + r(X_{teacher} - (T_f)\text{Mean}) \quad \text{Equation (1)}$$

Further, it is determined, whether the new solution is better than the old solution, and accordingly the student/student's solution is updated. Likewise, in the learning phase, a student, $X_i$, is randomly selected from the population, and evaluated whether $X_j$ is better than $X_i$. If $X_i$ is better than $X_j$, than the following equation is computed:

$$X_{new} = X_{iold} += r(X_i - X_j) \quad \text{Equation (2)}$$

Else if $X_j$ is better than $X_i$, the following equation is computed;

$$X_{new} = X_{iold} + (X_j - X_i) \quad \text{Equation (3)}$$

If the new solution is better than the old solution, the student is updated accordingly. If the termination criteria is not achieved, the step of modifying the students is repeated. The teaching factor, $T_f$, is taken as either 1 or 2 and r is a random number between 0 and 1. The termination criteria can be a fixed number of iterations, a threshold of objective function needed, a minimum allowed error, etc.

Subsequently, the TLBO is also applied to feature/variable/descriptor selection by Rajeev et al. titled "A novel methodology for feature subset selection using TLBO algorithm", wherein more than one teacher were introduced for each session and by Suresh et al. titled "Rough set and TLBO technique for optimal feature selection", wherein the same were employed along with rough set approach. Further, various works have also proposed several modifications of the basic technique such as replacing worst student with other elite solutions, eliminating duplicates randomly, and introducing learning through tutorial or self-motivation. It is worth mentioning that majority of the applications of the TLBO method is focused on optimization solutions in engineering domain and its applications are not well established in the case of other domains such as life sciences, education etc.

SUMMARY

Embodiments of the present disclosure present technological improvements as solutions to one or more of the above-mentioned technical problems recognized by the inventors in conventional systems. For example, in one aspect, a processor implemented method is provided. The method comprising: (a) defining, by one or more processors (i) a population size pertaining to a trainees population comprising one or more trainees, wherein the one or more trainees from the trainees population are associated with a set of unique variables, (ii) number of iterations, (iii) a subset size, correlation co-efficient 'r', and termination criteria comprising (iv) maximum avowed interrelation coefficient of independent variables $R_{int}$, (v) an objective function to be satisfied by the one or more trainees $r_{min}^2$, and (vi) number of additional unique variables introduced in a teaching phase and a learning phase $Num_{rand}$; (b) initializing, by the one or more processors, the trainees population with a value defined for an objective function above a threshold value; (c) calculating an objective function of the trainees population and identifying an optimal trainer from the trainees population based on the calculated objective functions; performing in the teaching phase; (d) creating, for each trainee from the trainees population, a teaching pool using the set of unique variables of (i) the optimal trainer and (ii) the one or more trainees; (e) adding additional unique variables to the teaching pool to obtain an updated teaching pool; (f) performing, for a subset size of S, an exhaustive search on the updated teaching pool to obtain a 'm' subset of variables and associated objective functions; (g) performing a first comparison of (i) the objective functions of the 'm' subset of variables with (ii) one or more objective functions of the set of unique variables associated with the optimal trainer, and (iii) one or more objective functions of the set of unique variables associated with each trainee; and (h) updating one of (i) the set of unique variables associated with the optimal trainer, or (ii) the set of unique variables associated with each trainee based on the first comparison; performing in the learning phase; (i) selecting at least one trainee being associated with a set of unique variables; (j) creating, for each trainee from the trainees population, a learning pool using the set of unique variables of (i) the at least one selected trainee and (ii) the one or more trainees; (k) adding additional variables to the learning pool to obtain an updated learning pool; (l) performing, for a subset size of S, an exhaustive search on the updated learning pool upon the additional variable being added to obtain a 'n' subset of variables and associated objective functions; (m) performing a second comparison of (i) the objective functions of the 'n' subset of variables with (ii) one or more objective functions of the set of unique variables associated with the at least one selected trainee, and (iii) one or more objective functions of the set of unique variables associated with each trainee; and (n) updating one of (i) the set of unique variables associated with the at least one selected trainee, or (ii) the set of unique variables associated with each trainee based on the second comparison; and iteratively performing the steps (d) to (h) and the step (i)-(n) until the termination criteria is satisfied to obtain an optimal subset of variables that are selected for the teaching phase and the learning phase.

In an embodiment, the teaching pool is created in the teaching phase by combining the set of unique variables of the optimal trainer with that of the one or more trainees. In an embodiment, the learning pool is created in the learning phase by combining the set of unique variables of the at least one selected trainee with that of the one or more trainees.

In an embodiment, when the objective functions of 'm' subset of variables is minimum or maximum than the one or more objective functions of the set of unique variables associated with the optimal trainer, the set of unique variables associated with the optimal trainer is updated. In an embodiment, when the objective functions of the 'm' subset of variables is minimum or maximum than the one or more objective functions than the set of unique variables associated with each trainee, the set of unique variables associated with each trainee is updated.

In an embodiment, when the objective functions of 'n' subset of variables is minimum or maximum than the one or more objective functions of the set of unique variables associated with the at least one selected trainee, the set of unique variables associated with the at least one selected trainee is updated. In an embodiment, when the objective functions of 'n' subset of variables is minimum or maximum than the one or more objective functions of the set of unique variables associated with each of the trainee, the set of unique variables associated with each of the trainee is updated. In an embodiment, the method further comprises generating one or more predictive models based on the optimal subset of variables.

In another aspect, a system is provided. The system comprises a memory storing instructions; one or more communication interfaces; and one or more hardware processors coupled to the memory via the one or more communication interfaces, wherein the one or more hardware processors are configured by the instructions to: (a) define (i) a population size pertaining to a trainees population comprising one or more trainees, wherein the one or more trainees from the trainees population are associated with a set of unique variables, (ii) number of iterations, (iii) a subset size, correlation co-efficient 'r', and termination criteria comprising (iv) maximum allowed interrelation coefficient of independent variables $r_{int}^2$, (v) an objective function to be satisfied by the one or more trainees $r_{min}^2$, and (vi) number of additional unique variables introduced in a teaching phase and a learning phase Num$_{rand}$, (b) initialize the trainees population with a value defined for an objective function above a threshold value, (c) calculate an objective function of the trainees population and identifying an optimal trainer from the trainees population based on the calculated objective function; in the teaching phase: (d) create, for each trainee from the trainees population, a teaching pool using the set of unique variables of (i) the optimal trainer and (ii) the one or more trainees; (e) add additional unique variables to the teaching pool to obtain an updated teaching pool; (f) perform, for a subset size of S, are exhaustive search on the updated teaching pool to obtain a 'm' subset of variables and associated objective functions; (g) perform a first comparison of (i) the objective functions of the 'm' subset of variables with (ii) one or more objective functions of the set of unique variables associated with the optimal trainer, and (iii) one or more objective functions of the set of unique variables associated with each trainee; and (h) update one of (i) the set of unique variables associated with the optimal trainer, or (ii) the set of unique variables associated with each trainee based on the first comparison; in the learning phase: (i) select at least one trainee being associated with a set of unique variables; (j) create, for each trainee from the trainees population, a learning pool using the set of unique variables of (i) the at least one selected trainee and (ii) the one or more trainees; (k) add additional variables to the learning pool to obtain an updated learning pool; (l) perform, for a subset size of S, an exhaustive search on the updated learning pool upon the additional variable being added to obtain a 'n' subset of variables and associated objection functions; (m) perform a second comparison of (i) the objective functions of the 'n' subset of variables with (ii) one or more objective functions of the set of unique variables associated with the at least one selected trainee, and (iii) one or more objective functions of the set of unique variables associated with each trainee; and (n) update one of (i) the set of unique variables associated with the at least one selected trainee, or (ii) the set of unique variables associated with each trainee based on the second comparison; and iteratively performing the steps (d) to (h) and the step (i)-(n) until the termination criteria is satisfied to obtain an optimal subset of variables that are selected for the teaching phase and the learning phase.

In an embodiment, the one or more hardware processors are further configured by the instructions to generate one or more predictive models based on the selected optimal subset of variables. In an embodiment, when the objective functions of 'm' subset of variables is minimum or maximum than the one or more objective functions of the set of unique variables associated with the optimal trainer, the set of unique variables associated with the optimal trainer is updated. In an embodiment, when the objective functions of the 'm' subset of variables is minimum or maximum than the one or more objective functions than the set of unique variables associated with each trainee, the set of unique variables associated with each trainee is updated.

In an embodiment, when the objective functions of 'n' subset of variables is minimum or maximum than the one or more objective functions of the set of unique variables associated with the at least one selected trainee, the set of unique variables associated with the at least one selected trainee is updated. In an embodiment, when the objective functions of 'n' subset of variables is minimum or maximum than the one or more objective functions of the set of unique variables associated with each of the trainee, the set of unique variables associated with each of the trainee is updated.

In yet another aspect, one or more non-transitory machine readable information storage mediums comprising one or more instructions is provided. The one or more instructions which when executed by one or more hardware processors causes defining, (i) a population size pertaining to a trainees population comprising one or more trainees, wherein the one or more trainees from the trainees population are associated with a set of unique variables, (ii) number of iterations, (iii) a subset size, correlation co-efficient 'r', and termination criteria comprising (iv) maximum allowed interrelation coefficient of independent variables $R_{int}$, (v) an objective function to be satisfied by the one or more trainees $r_{min}^2$, and (vi) number of additional unique variables introduced in a teaching phase and a learning phase $Num_{rand}$; (b) initializing, by the one or more processors, the trainees population with a value defined for an objective function above a threshold value; (c) calculating an objective function of the trainees population and identifying an optimal trainer from the trainees population based on the calculated objective function; performing in the teaching phase; (d) creating, for each trainee from the trainees population, a teaching pool using the set of unique variables of (i) the optimal trainer and (ii) the one or more trainees; (e) adding additional unique variables to the teaching pool to obtain an updated teaching pool; (f) performing, for a subset size of S, an exhaustive search on the updated teaching pool to obtain a 'm' subset of variables and associated objective functions; (g) performing a first comparison of (i) the objective functions of the 'm' subset of variables with (ii) one or more objective functions of the set of unique variables associated with the optimal trainer, and (iii) one or more objective functions of the set of unique variables associated with each trainee; and (h) updating one of (i) the set of unique variables associated with the optimal trainer, or (ii) the set of unique variables associated with each trainee based on the first comparison; performing in the learning phase; (i) selecting at least one trainee being associated with a set of unique variables; (j) creating, for each trainee from the trainees population, a learning pool using the set of unique variables of (i) the at least one selected trainee and (ii) the one or more trainees; (k) adding additional variables to the learning pool to obtain an updated learning pool; (l) performing, for a subset size of S, an exhaustive search on the updated learning pool upon the additional variable being added to obtain a 'n' subset of variables and associated objection functions; (m) performing a second comparison of (i) the objective functions of the 'n' subset of variables with (ii) one or more objective functions of the set of unique variables associated with the at least one selected trainee, and (iii) one or more objective functions of the set of unique variables associated with each trainee; and (n) updating one of (i) the set of unique variables associated with the at least one selected trainee, or (ii) the set of unique variables associated with each trainee based on the second comparison; and iteratively performing the steps (d) to (h) and the step (i)-(n) until the termination criteria is satisfied to obtain an optimal subset of variables that are selected for the teaching phase and the learning phase.

In an embodiment, the instructions which when executed by the one or more hardware processors further cause generating one or more predictive models based on the optimal subset of variables.

It is to be understood that both the foregoing general description and the following detailed description are exemplary and explanatory only and are not restrictive of the invention, as claimed.

BRIEF DESCRIPTIONS OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments of the present disclosure provides systems and methods for selecting optimal variables using modified teaching learning based search optimization technique. Based on the prior works of TLBO, the method was chosen to build Quantitative structure-activity relationship (QSAR) models using structural variables/descriptors of an input data (e.g. Structural variables derived from chemical structures of drug and drug like compounds). For instance, an exemplary dataset with drug and drug like 84 compounds and 326 descriptors, with an objective of maximizing the correlation coefficient of multiple linear regression (MLR) model was used to evaluate the performance of TLBO. Each student of the population is represented as a combination of subset size S from the available in independent variables. For example, if an optimal subset of size 5 is needed from the 326 descriptors to predict the quantitative properties of the compounds, a student will be represented as (8, 93, 106, 115, 285). According to the TLBO each of the column number in the subset 'S' depicts each student's mark in a particular subject. The results of the TLBO method for a population size of 1000, 100 iterations and inter correlation coefficient of 0.75 is illustrates in below Table 1 (Detailed results in Appendix):

TABLE 1

| Subset | Optimal Result | | |
|---|---|---|---|
| Size | Subset Variables | MLR $r^2$ | Reproducibility |
| 3 | 159, 307, 311 | 0.7239 | 7/10 |
| 4 | 33, 108, 265, 307 | 0.7511 | 1/10 |
| 5 | 88, 155, 165, 307, 311 | 0.7613 | 1/10 |
| 6 | 130, 155, 164, 175, 307, 311 | 0.7771 | 1/10 |

As observed from the above results, the reproducibility of the basic technique decreases with increase in the subset size. Additionally, to improve the results of the basic TLBO, various modifications suggested by prior works were implemented. But these variations in the basic technique have not resulted in any significant improvement in the quality of the results. Based on in-depth analyses of the known implementations and results derived from them, it can be inferred (or observed) that: 1) the solution has a high likelihood to get caught in local optimums, 2) the approach of elitism without eliminating duplicates has resulted in stagnation of the results due to lack of diversity in population, 3) the random number and teaching factor does not logically related to the subsets, depiction of columns with numbers, and 4) the random number is not a user control parameter and can result in irreproducible results.

The basic TLBO technique has its own demerits as and when it applied to a feature selection, for example, it suffers from treating the subset or independent variables as numbers that have valuable information of their relation to the end point (dependent variable Y) i.e., the column number holds information about the quality of the descriptor/independent variables it is representing. These numbers are a mere representation or can be treated as identifiers/names and cannot be used to carry valuable information of the entity but to represent them.

The following modifications are made to existing TLBO technique based on results from experimentations (trials):

Modification 1

In an embodiment of the present disclosure, the subsets/students are treated as just representations and the steps of the basic traditional TLBO technique of FIG. 1 are changed to consider all the possible combinations of subset size 'S' from the variables of student and teacher or co-student combined. For example, for a subset size of 3, if a student subset is (3, 115, 312) and teacher subset is (19, 159, 258) modified step checks all 3 subset combinations of (3, 19, 116, 159, 258, 312). This step is a move towards exhaustive/deterministic approach, which guarantees to find the best solution with time constraints. The following are the results of the method with the modification using the same population size of 1000, 100 iterations and inter correlation coefficient of 0.75 as above depicted in below Table 2:

TABLE 2

| Subset | Optimal Solution | | |
|---|---|---|---|
| Size | Subset | MLR $r^2$ | Reproducibility |
| 3 | 142, 178, 263 | 0.714439 | 10/10 |
| 4 | 108, 157, 307, 311 | 0.755437 | 9/10 |
| 5 | 92, 159, 166, 307, 311 | 0.799594 | 5/10 |
| 6 | 88, 150, 166, 283, 307, 311 | 0.833168 | 7/10 |
| 7 | 97, 155, 178, 262, 263, 283, 311 | 0.860754 | 6/10 |

As it can be observed the randomness in the optimal results of the method is decreasing when compared to the previous results.

Modification 2

TLBO technique can be further integrated with another aspect of the social set up of choosing optimal students to achieve better results. Extending this ideology to the proposed methodology by the embodiments of the present disclosure, an initial criteria is defined to select a subset as student of the population as minimum value of objective function that is to be met. Therefore, while initializing the student population, each student is verified to have a minimum value of objective function i.e., a minimum $r^2$, correlation coefficient of MLR, e.g., 0.6. The results along with current modification, using the same parameters of population size of 1000, 100 iterations and inter correlation coefficient of 0.75 and initial population selection criteria of minimum $r^2$ value of 0.5 are illustrated in below table 3:

TABLE 3

| Subset | Optimal Solution | | |
|---|---|---|---|
| Size | Subset | MLR $r^2$ | Reproducibility |
| 3 | 159, 307, 311 | 0.723931 | 10/10 |
| 4 | 108, 157, 307, 311 | 0.755437 | 10/10 |
| 5 | 92, 159, 166, 307, 311 | 0.799594 | 10/10 |
| 6 | 88, 159, 166, 283, 307, 311 | 0.833168 | 8/10 |
| 7 | 977, 155, 178, 262, 263, 283, 311 | 0.8607539 | 9/10 |

It can be noted from the above results that the reproducibility for subset sizes of 3, 4, and 5 has changed to 100% with the current modifications.

Modification 3

One of the potential drawbacks of the heuristic approaches is the reliability of results due to non-reproducible results. This is mainly due to the random elements/numbers involved in the steps on which the method relies upon. As it can be observed from the changes the embodiments of the present disclosure eliminate the random number that the traditional TLBO technique uses. Therefore, this minimizes an element of irreproducibility. Further, since the method in itself does not explore the complete search space of the problem, there always is an occurrence of false results or local optimization. To further minimize this occurrence, the embodiments of the present disclosure adds (or introduces) additional unique independent variables to the combination set of student (trainee) and teacher (trainer) or co-student/co-learner in the teaching and learning phase respectively before performing the exhaustive search on this combination. This step ensures that stagnation of result in local minimum is minimized. This approach can also be seen as mimicking the social set up through introducing study material (additional variables) to the group while exchanging the knowledge or studying.

Figure 2:
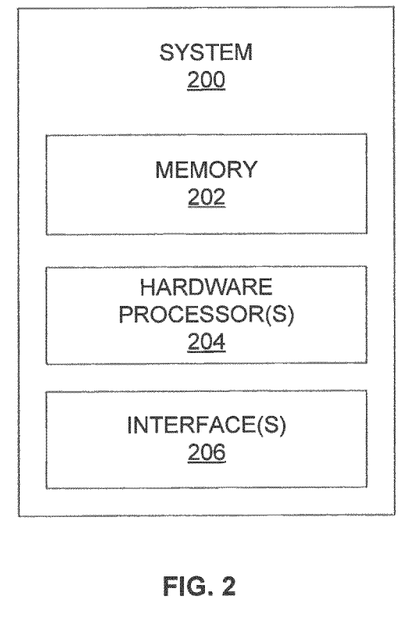
FIG. 2 illustrates an exemplary block diagram of a system for selecting optimal variables using a modified teaching learning based search optimization technique according to an embodiment of the present disclosure.
Figure 3:
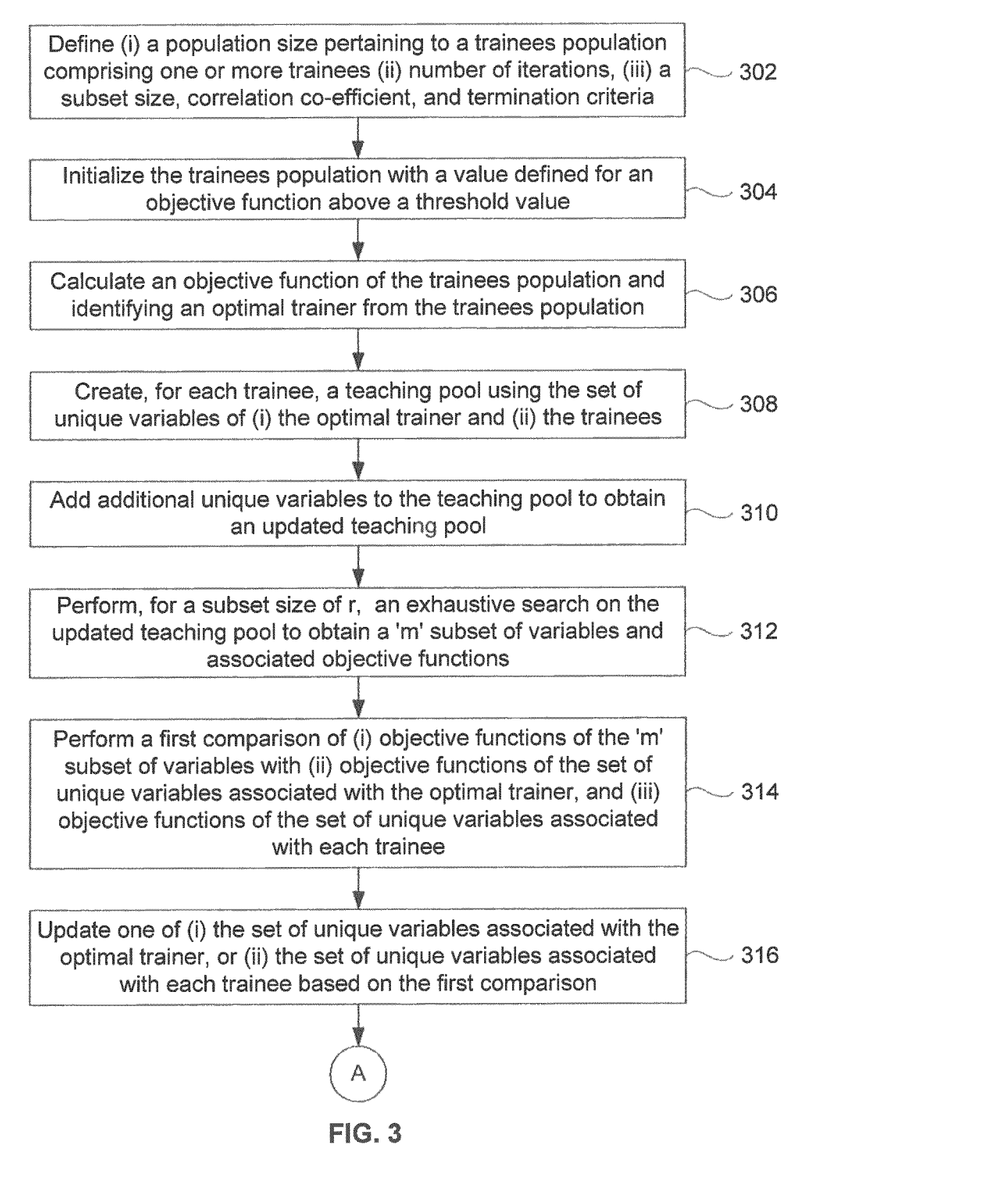
FIG. 3 illustrates an exemplary flow diagram of a processor implemented method for selecting optimal variables using a modified teaching learning based search (MTLBSO) technique according to an embodiment of the present disclosure.

Referring now to the drawings, and more particularly to FIG. 2 through 3, where similar reference characters denote corresponding features consistently throughout the figures, there are shown preferred embodiments and these embodiments are described in the context of the following exemplary system and/or method.

FIG. 2 illustrates an exemplary block diagram of a system 200 for selecting optimal variables using a modified teaching learning based search optimization (MTLBSO) technique according to an embodiment of the present disclosure. In an embodiment, the system 200 includes one or more processors 204, communication interface device(s) or input/output (I/O) interface(s) 206, and one or more data storage devices or memory 202 operatively coupled to the one or more processors 204. The one or more processors 204 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 200 can be implemented in a variety of computing systems, such as laptop computers, notebooks, hand-held devices, workstations, mainframe computers, servers, a network cloud and the like.

The I/O interface device(s) 206 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 200 can be stored hi the memory 202.

FIG. 3 with reference to FIG. 2, illustrates an exemplary flow diagram of a processor implemented method for selecting optimal variables using a modified teaching learning based search (MTLBSO) technique according to an embodiment of the present disclosure. In an embodiment, the system 200 comprises one or more data storage devices or the memory 202 operatively coupled to the one or more hardware processors 204 and is configured to store instructions for execution of steps of the method by the one or more processors 204. The steps of the method of the present disclosure will now be explained with reference to the components of the system 200 as depicted in FIG. 2, and the flow diagram. In an embodiment of the present disclosure, at step 302, the one or more processors 204 define (i) a population size pertaining to a trainees population comprising one or more trainees, wherein the one or more trainees from the trainees population are associated with a set of unique variables, (ii) number of iterations, (iii) a subset size, correlation co-efficient 'r', and termination criteria comprising (iv) maximum allowed interrelation coefficient of independent variables $R_{int}$, (v) an objective function to be satisfied by the one or more trainees $r_{min}^2$, and (vi) number of additional unique variables introduced in a teaching phase and a learning phase $Num_{rand}$. In an embodiment of the present disclosure, at step 304, the one or more processors 204 initialize the trainees population with a value defined for an objective function above threshold. For example, the system 200 initializes the trainees population with $r^2 > r_{min}^2$.

In an embodiment of the present disclosure, at step 306, the one or more processors 204 calculate an objective function of the trainees population and identify an optimal trainer from the trainees population based on the calculated objective function. In an embodiment of the present disclosure, the one or more processors 204, perform steps 308 till 314 in a teaching phase. At step 308, the one or more processors 204, create, for each trainee from the trainees population, a teaching pool using the set of unique variables of (i) the optimal trainer and (ii) the one or more trainees. In an embodiment of the present disclosure, the term variable may be referred to as feature, or attribute variable subset, and may be interchangeably used herein. In an embodiment of the present disclosure, at step 310, the one or more processors 204, adds additional unique (independent) variables to the teaching pool to obtain an updated teaching pool. In an embodiment of the present disclosure, at step 312, the one or more processors 204 perform, for a subset size of 'S', an exhaustive search on the updated teaching pool to obtain a 'm' subset of variables and associated objective functions.

In an embodiment of the present disclosure, at step 314, the one or more processors 204 performs a first comparison of (i) one or more objective functions of the 'm' subset of variables with (ii) one or more objective functions of the set of unique variables associated with the optimal trainer, and (iii) one or more objective functions of the set of unique variables associated with each trainee. In an embodiment of the present disclosure, at step 316, the one or more processors 204 updates one of (i) the set of unique variables associated with the optimal trainer, or (ii) the set of unique variables associated with each trainee based on the first comparison. In one example embodiment, when the objective functions of 'm' subset of variables is minimum or maximum than the objective functions of the set of unique variables associated with the optimal trainer, the objective functions of the set of unique variables associated with the optimal trainer is updated. In another example embodiment, when the objective functions of the 'm' subset of variables is minimum or maximum than the objective functions of the set of unique variables associated with each trainee, the set of unique variables associated with each trainee is updated.

In an embodiment of the present disclosure, the one or more processors 204, perform steps 318 till 326 in a learning phase. In an embodiment of the present disclosure, at step 318, the one or more processors 204 select at least one trainee being associated with a set of unique variables, each of a variable from the set of unique variables of the selected trainee is associated with an objective function. In an embodiment of the present disclosure, at step 320, the one or more processors 204 create, for each trainee from the trainees population, a learning pool using the set of unique variables of (i) the at least one selected trainee and (ii) the one or more trainees. In an embodiment of the present disclosure, at step 322, the one or more processors 204 adds (or introduces) additional unique (independent) variables to the learning pool to obtain an updated learning pool. In an embodiment of the present disclosure, at step 324, the one or more processors 204 perform, for a subset size of 'S', an exhaustive search on the updated learning pool upon the additional variable being added to obtain a 'n' subset of variables and associated objection functions. In one example embodiment, the size of the 'm' subset of variables and the 'n' subset of variables may be identical. In another example embodiment, the size of the 'm' subset of variables and the 'n' subset of variables may be different from each other. In an embodiment of the present disclosure, at step 326, the one or more processors 204 perform a second comparison of (i) one or more objective functions of the 'n' subset of variables with (ii) one or more objective functions of the set of unique variables associated with the at least one selected trainee, and (iii) one or more objective functions of the set of unique variables associated with each trainee.

In an embodiment of the present disclosure, at step 328, the one or more processors 204 update one of (i) the set of unique variables associated with the at least one selected trainee, or (ii) the set of unique variables associated with each trainee based on the second comparison. In one example embodiment, when the objective functions of the 'n' subset of variables are minimum or maximum than the objective functions of the set of unique variables associated with the at least one selected trainee, the set of unique variables associated with the at least one selected trainee is updated. In another example embodiment, when the objective functions of the 'n' subset of variables are minimum or maximum than the one or more objective functions of the set of unique variables associated with each trainee, the set of unique variables associated with each of the trainee is updated. In an embodiment of the present disclosure, at step 328, the one or more processors 204 iteratively perform the steps 306 till 316 and the step 318-328 until the termination criteria is satisfied to obtain an optimal subset of variables that is selected for the teaching phase and the learning phase. At step 330, the one or more processors 204 generate one or more predictive models based on the selected optimal subset of variables. In an embodiment, one or more predictive models may comprise, but are not limited to, one or more linear regression models, one or more non-linear regression models, and the like.

An implementation of the proposed methodology by the embodiments of the present disclosure is illustrated by way of example below: Suppose, student subset={Molecular weight, Solubility}, and
teacher subset={Surface area, Atomic type}

Then, Student+Teacher={Molecular Weight, Solubility, Surface Area, Atomic type}

A unique variable, for example, {Polarizability} is added to the above set to obtain an updated set of variables as illustrated below:

{Molecular Weight, Solubility, Surface Area, Atomic type, Polarizability}

An exhaustive search is performed for a subset of 2 from the above set of 5 to obtain an optimal set of variables that is selected for the teaching phase and the learning phase. The additional unique variables can be selected for addition in following ways that are illustrated by way of examples:

Case 1

To select variables that are highly correlated to the end variable i.e., the dependent variable, which are being modeled. Additional unique variables whose correlation with Y is more than the average correlation value of all the independent variables are selected and introduced randomly to each of the phases.

Case 2

As noted by prior works/attempts, there can be variables that are least correlated with the end point but when combined with other variables reveal useful information. To handle such scenarios, the embodiments of the present disclosure add these additional unique variables irrespective of their correlation with Y.

Further, a combination of any of the above cases to add unique variables can be used to derive the optimal solution. The results of the combination of the above two cases with the population size of 1000, 100 iterations, inter correlation coefficient of 0.75 and initial population selection criteria of minimum $r^2$ value of 0.5 and introducing 2 additional variables/descriptors in each phase is given in the below Table 4.

TABLE 4

| Subset Size | Optimal Solution Subset | MLR $r^2$ | Reproducibility |
|---|---|---|---|
| 3 | 159, 307, 311 | 0.723931 | 10/10 |
| 4 | 108, 157, 307, 311 | 0.755437 | 10/10 |
| 5 | 92, 159, 166, 307, 311 | 0.799594 | 10/10 |
| 6 | 88, 159, 166, 283, 307, 311 | 0.833168 | 10/10 |
| 7 | 977, 155, 178, 262, 263, 283, 311 | 0.8607539 | 10/10 |

Additionally, the diversity of the solutions is also maintained in the proposed method of the present disclosure by not allowing any duplicates in the student population, and by (fairly) introducing, with equal probability, each and every variable, as explained in the section "Modification 3", to the teaching and learning phase.

Although the embodiments of the present disclosure describe examples of input dataset such as drugs/drug like compounds, the methodology described by the embodiments of the present disclosure may be implemented for other type of datasets across domains, for example, education, finance, healthcare, economic data, and the like. It is to be understood that these examples should not be construed as limiting the scope of the embodiments herein.

The embodiments of the present disclosure provide systems and methods for selecting optimal variables using modified teaching learning based search optimization (MTLBSO) technique. Unlike traditional TLBO technique, where in the teaching phase or learning phase the exchange of knowledge is through random number and a teaching factor, the proposed technique performs exhaustive search of the variables of trainer (teacher) and trainee (student) or co-trainee (co-student) combined, and eliminates the dependency on random number and teaching factor. This ensures that the proposed MTLBSO technique provides a deterministic step, which guarantees optimal solution for the given input i.e., variables of (trainee) student and teacher (trainer) or co-learner. Unlike traditional TLBO technique which uses teaching factor and random number, the proposed MTLBO does not rely on teaching factor and random number. This enables the system 200 to minimize randomness in the deterministic problem of finding the optimal subset of variables. Further, prior art initializes population randomly and without duplicity check. In the present disclosure, the proposed MTBLSO technique initializes the population with defined criteria such as minimum objective function value and non-correlated variables in subset without any duplicate entries in the population. This ensures more combinations are explored and also higher quality of results when compared to the other scenarios. Traditional TLBO (as seen in FIG. 1) adds self-learning term in the equation (1), (2) and (3), whereas the proposed MTLBSO technique introduces additional unique variables in each of the teaching and learning phase before performing exhaustive search which minimizes the occurrence of local optimization and stagnation of results.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fail within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, BLU-RAYs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for generating predictive models, the method comprising:
   (a) defining, by one or more processors (i) a population size pertaining to a trainees population comprising one or more trainees, wherein the one or more trainees from the trainees population are associated with a set of unique variables, (ii) number of iterations, (iii) a subset size, correlation co-efficient 'r', and termination criteria comprising (iv) maximum allowed interrelation coefficient of independent variables $R_{int}$ (v) an objective function to be satisfied by the one or more trainees $r_{min}^2$, and (vi) number of additional unique variables introduced in a teaching phase and a learning phase $Num_{rand}$;
   (b) initializing, by the one or more processors, the trainees population with a value defined for an objective function above a threshold value;
   (c) calculating an objective function of the trainees population and identifying an optimal trainer from the trainees population based on the calculated objective function;
   the teaching phase comprises:
   (d) creating, for each trainee from the trainees population, a teaching pool using the set of unique variables of (i) the optimal trainer and (ii) the one or more trainees;
   (e) adding additional unique variables to the teaching pool to obtain an updated teaching pool;
   (f) performing, for a subset size of s, an exhaustive search on the updated teaching pool to obtain a 'm' subset of variables and associated objective functions;
   (g) performing a first comparison of (i) the objective functions of the 'm' subset of variables with (ii) one or more objective functions of the set of unique variables associated with the optimal trainer, and (iii) one or more objective functions of the set of unique variables associated with each trainee; and (h) updating one of (i) the set of unique variables associated with the optimal trainer, or (ii) the set of unique variables associated with each trainee based on the first comparison;

the learning phase comprises:
(i) selecting at least one trainee being associated with a set of unique variables;
(j) creating, for each trainee from the trainees population, a learning pool using the set of unique variables of (i) the at least one selected trainee and (ii) the one or more trainees;
(k) adding additional variables to the learning pool to obtain an updated learning pool;
(l) performing, for a subset size of s, an exhaustive search on the updated learning pool upon the additional variable being added to obtain a 'n' subset of variables and associated objection functions;
(m) performing a second comparison of (i) the objective functions of the 'n' subset of variables with (ii) one or more objective functions of the set of unique variables associated with the at least one selected trainee, and (iii) one or more objective functions of the set of unique variables associated with each trainee; and
(n) updating one of (i) the set of unique variables associated with the at least one selected trainee, or (ii) the set of unique variables associated with each trainee based on the second comparison;
(o) iteratively performing the steps (d) to (h) and the steps (i) to (n) until the termination criteria is satisfied to obtain an optimal subset of variables that are selected for the teaching phase and the learning phase; and
(p) generating one or more predictive models based on the selected optimal subset of variables.

2. The method of claim 1, wherein the teaching pool is created in the teaching phase by combining the set of unique variables of the optimal trainer with that of the one or more trainees.

3. The method of claim 1, wherein the learning pool is created in the learning phase by combining the set of unique variables of the at least one selected trainee with that of the one or more trainees.

4. The method of claim 1, wherein when the objective functions of 'm' subset of variables is minimum or maximum than the one or more objective functions of the set of unique variables associated with the optimal trainer, the set of unique variables associated with the optimal trainer is updated.

5. The method of claim 1, wherein when the objective functions of the 'm' subset of variables is minimum or maximum than the one or more objective functions than the set of unique variables associated with each trainee, the set of unique variables associated with each trainee is updated.

6. The method of claim 1, wherein when the objective functions of 'n' subset of variables is minimum or maximum than the one or more objective functions of the set of unique variables associated with the at least one selected trainee, the set of unique variables associated with the at least one selected trainee is updated.

7. The method of claim 1, wherein when the objective functions of 'n' subset of variables is minimum or maximum than the one or more objective functions of the set of unique variables associated with each of the trainee, the set of unique variables associated with each of the trainee is updated.

8. A system to generate predictive models, the system comprising:
a memory storing instructions;
one or more communication interfaces; and
one or more hardware processors coupled to the memory via the one or more communication interfaces, wherein the one or more hardware processors are configured by the instructions to:

a) define (i) a population size pertaining to a trainees population comprising one or more trainees, wherein the one or more trainees from the trainees population are associated with a set of unique variables, (ii) number of iterations, (iii) a subset size, correlation co-efficient 'r', and termination criteria comprising (iv) maximum allowed interrelation coefficient of independent variables $R_{int}$, (v) an objective function to be satisfied by the one or more trainees $r_{min}^2$, and (V) number of additional unique variables introduced in a teaching phase and a learning phase $Num_{rand}$;

b) initialize the trainees population with a value defined for an objective function above a threshold value;

c) calculate an objective function of the trainees population and identifying an optimal trainer from the trainees population based on the calculated objective function; in the teaching phase;

d) create, for each trainee from the trainees population, a teaching pool using the set of unique variables of (i) the optimal trainer and (ii) the one or more trainees;

e) add additional unique variables to the teaching pool to obtain an updated teaching pool;

f) perform, for a subset size of s, an exhaustive search on the updated teaching pool to obtain a 'm' subset of variables and associated objective functions;

g) perform a first comparison of (i) the objective functions of the 'm' subset of variables with (ii) one or more objective functions of the set of unique variables associated with the optimal trainer, and (iii) one or more objective functions of the set of unique variables associated with each trainee; and h) update one of (i) the set of unique variables associated with the optimal trainer, or (ii) the set of unique variables associated with each trainee based on the first comparison;

in the learning phase:
i) select at least one trainee being associated with a set of unique variables;
j) create, for each trainee from the trainees population, a learning pool using the set of unique variables of (i) the at least one selected trainee and (ii) the one or more trainees;
k) add additional variables to the learning pool to obtain an updated learning pool;
l) perform, for a subset size of s, an exhaustive search on the updated learning pool upon the additional variable being added to obtain a 'n' subset of variables and associated objection functions;
m) perform a second comparison of (i) the objective functions of the 'n' subset of variables with (ii) one or more objective functions of the set of unique variables associated with the at least one selected trainee, and (iii) one or more objective functions of the set of unique variables associated with each trainee;
n) update one of (i) the set of unique variables associated with the at least one selected trainee, or (ii) the set of unique variables associated with each trainee based on the second comparison;

o) iteratively perform the steps (d) to (h) and the steps (i) to (n) until the termination criteria is satisfied to obtain an optimal subset of variables that are selected for the teaching phase and the learning phase; and p) generate one or more predictive models based on the selected optimal subset of variables.

9. The system of claim 8, wherein when the objective functions of 'm' subset of variables is minimum or maximum than the one or more objective functions of the set of unique variables associated with the optimal trainer, the set of unique variables associated with the optimal trainer is updated.

10. The system of claim 8, wherein when the objective functions of the 'm' subset of variables is minimum or maximum than the one or more objective functions than the set of unique variables associated with each trainee, the set of unique variables associated with each trainee is updated.

11. The system of claim 8, wherein when the objective functions of 'n' subset of variables is minimum or maximum than the one or more objective functions of the set of unique variables associated with the at least one selected trainee, the set of unique variables associated with the at least one selected trainee is updated.

12. The system of claim 8, wherein when the objective functions of 'n' subset of variables is minimum or maximum than the one or more objective functions of the set of unique variables associated with each of the trainee, the set of unique variables associated with each of the trainee is updated.

13. One or more non-transitory machine-readable information storage mediums comprising one or more instructions which when executed by one or more hardware processors causes:

(a) defining, by one or more hardware processors (i) a population size pertaining to a trainees population comprising one or more trainees, wherein the one or more trainees from the trainees population are associated with a set of unique variables, (ii) number of iterations, (iii) a subset size, correlation co-efficient 'r', and termination criteria comprising (iv) maximum allowed interrelation coefficient of independent variables $R_{int}$, (v) an objective function to be satisfied by the one or more trainees $r_{min}^2$, and (vi) number of additional unique variables introduced in a teaching phase and a learning phase $Num_{rand}$;

(b) initializing, by the one or more hardware processors, the trainees population with a value defined for an objective function above a threshold value;

(c) calculating an objective function of the trainees population and identifying an optimal trainer from the trainees population based on the calculated objective function;

in the teaching phase;

(d) creating, for each trainee from the trainees population, a teaching pool using the set of unique variables of (i) the optimal trainer and (ii) the one or more trainees;

(e) adding additional unique variables to the teaching pool to obtain an updated teaching pool;

(f) performing, for a subset size of s, an exhaustive search on the updated teaching pool to obtain a 'm' subset of variables and associated objective functions;

(g) performing a first comparison of (i) the objective functions of the 'm' subset of variables with (ii) one or more objective functions of the set of unique variables associated with the optimal trainer, and (iii) one or more objective functions of the set of unique variables associated with each trainee; and (h) updating one of (i) the set of unique variables associated with the optimal trainer, or (ii) the set of unique variables associated with each trainee based on the first comparison;

in the learning phase:

(i) selecting at least one trainee being associated with a set of unique variables;

(j) creating, for each trainee from the trainees population, a learning pool using the set of unique variables of (i) the at least one selected trainee and (ii) the one or more trainees;

(k) adding additional variables to the learning pool to obtain an updated learning pool;

(l) performing, for a subset size of s, an exhaustive search on the updated learning pool upon the additional variable being added to obtain a 'n' subset of variables and associated objection functions;

(m) performing a second comparison of (i) the objective functions of the 'n' subset of variables with (ii) one or more objective functions of the set of unique variables associated with the at least one selected trainee, and (iii) one or more objective functions of the set of unique variables associated with each trainee;

(n) updating one of (i) the set of unique variables associated with the at least one selected trainee, or (ii) the set of unique variables associated with each trainee based on the second comparison;

(o) iteratively performing the steps (d) to (h) and the steps (i) to (n) until the termination criteria is satisfied to obtain an optimal subset of variables that are selected for the teaching phase and the learning phase; and (p) generating one or more predictive models based on the selected optimal subset of variables.

14. The one or more non-transitory machine-readable information storage mediums of claim 13, wherein the teaching pool is created in the teaching phase by combining the set of unique variables of the optimal trainer with that of the one or more trainees, and wherein the learning pool is created in the learning phase by combining the set of unique variables of the at least one selected trainee with that of the one or more trainees.

15. The one or more non-transitory machine-readable information storage mediums of claim 13,
wherein when the objective functions of 'm' subset of variables is minimum or maximum than the one or more objective functions of the set of unique variables associated with the optimal trainer, the set of unique variables associated with the optimal trainer is updated, and
wherein when the objective functions of the 'm' subset of variables is minimum or maximum than the one or more objective functions than the set of unique variables associated with each trainee, the set of unique variables associated with each trainee is updated.

16. The one or more non-transitory machine-readable information storage mediums of claim 13,
wherein when the objective functions of 'n' subset of variables is minimum or maximum than the one or more objective functions of the set of unique variables associated with the at least one selected trainee, the set of unique variables associated with the at least one selected trainee is updated, and
wherein when the objective functions of 'n' subset of variables is minimum or maximum than the one or more objective functions of the set of unique variables associated with each of the trainee, the set of unique variables associated with each of the trainee is updated.

\* \* \* \* \*